Figure 1:
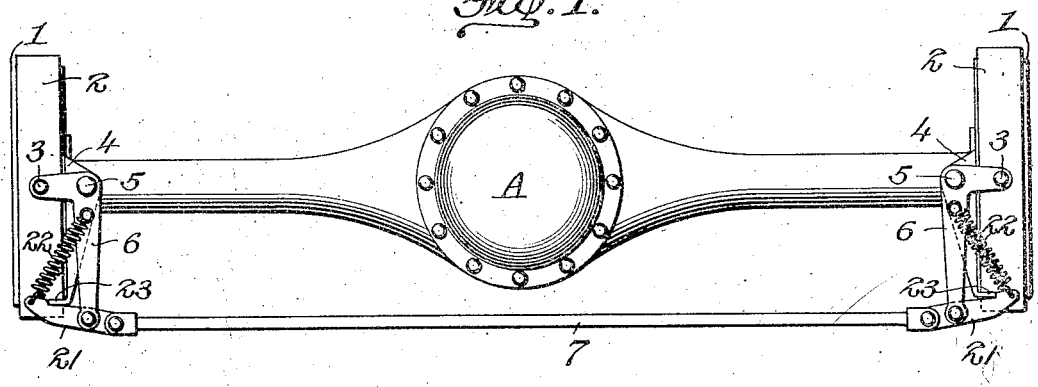

April 15, 1924.

G. L. SMITH

FRICTION BRAKE

Filed April 11, 1923    2 Sheets-Sheet 1

1,490,640

Inventor
G. L. Smith,
By Bright & Bailey
Attorneys

April 15, 1924.  
G. L. SMITH  
FRICTION BRAKE  
Filed April 11, 1923  
1,490,640  
2 Sheets-Sheet 2
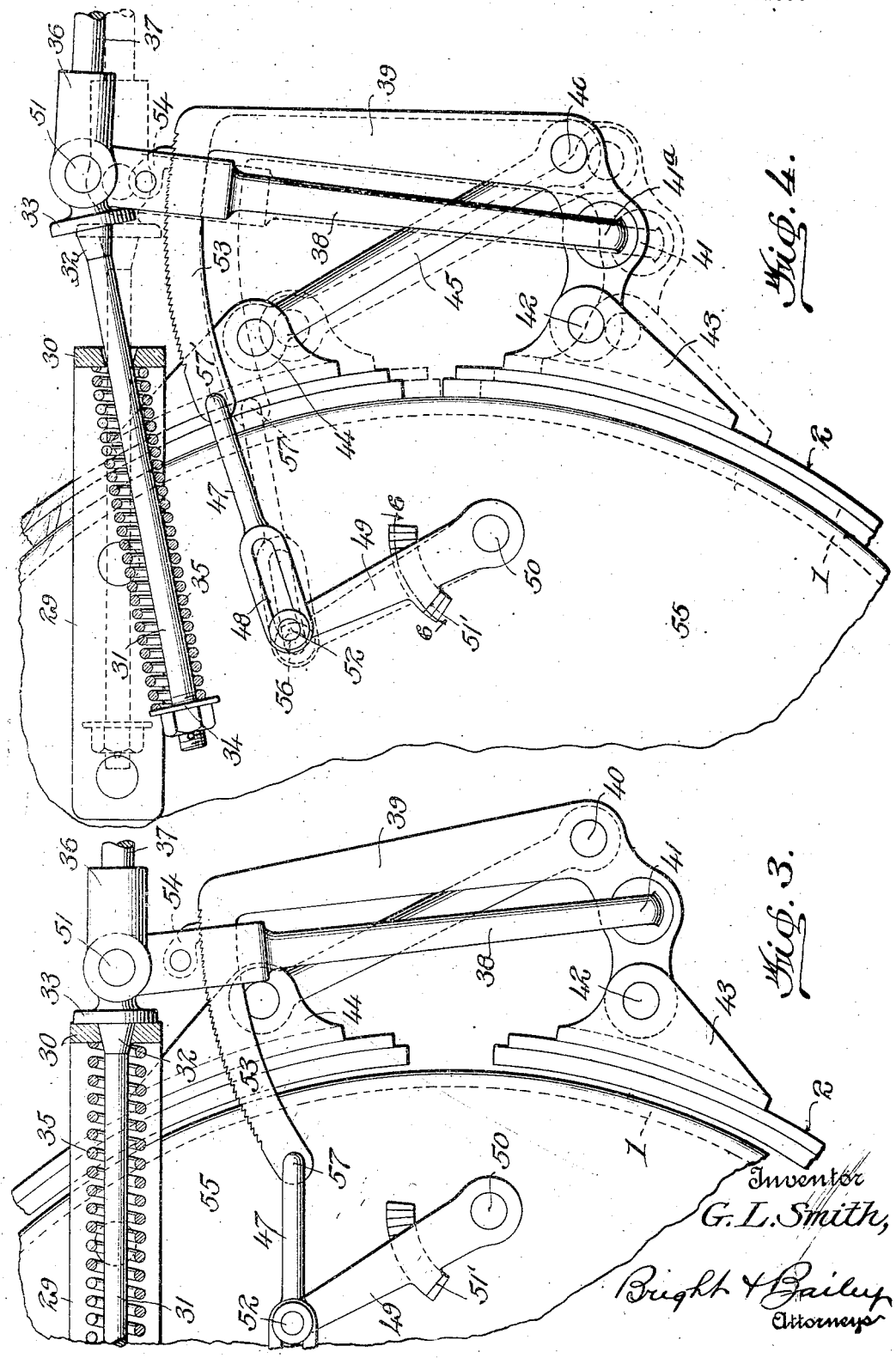

Patented Apr. 15, 1924.                                                    1,490,640

UNITED STATES PATENT OFFICE.

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

FRICTION BRAKE.

Application filed April 11, 1923. Serial No. 631,392.

*To all whom it may concern:*

Be it known that I, GEORGE L. SMITH, a citizen of the United States, and resident of Washington, in the District of Columbia, have invented certain new and useful Improvements in Friction Brakes, set forth in the annexed specification.

My invention relates to friction brakes operable in pairs or multiples of pairs, such as those usually fitted to the wheels of motor vehicles, and constitutes further development of the mechanism described in my Letters Patent No. 1,440,842 of January 2, 1923.

More particularly the invention of my present application relates to mechanism for equalizing the braking force exerted by duplicate brakes arranged for application to retard either of two opposite rotary movements, and including therein means for locking said mechanism inoperative when the brakes are applied to retard one of said movements. Furthermore, my present invention embodies means for maintaining the operation of said mechanism effective to equalize said braking effect, irrespective of the wear of the brakes, and such other novelty in detail construction as is essential to attain the main purposes of the invention.

I will describe my invention as applied to an external contracting brake system as such a system is well known and easily understood, and in addition, I will indicate briefly its application to an internal expanding brake system.

In the drawings illustrating my invention—

Figure 2:
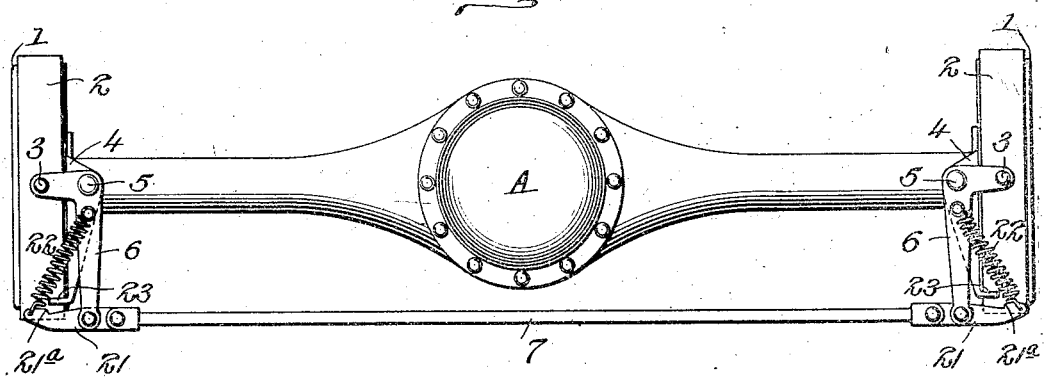

Figure 1 is a rear view of a rear axle of an automobile equipped with my invention with parts shown in inoperative position;

Figure 2, a view similar to Figure 1 with parts shown in operative position;

Figure 3, a partial view partly in section of the left brake viewed from the inside with parts shown in inoperative position;

Figure 4, a view similar to Figure 3 with the parts shown in full and dotted lines in the positions they would occupy under certain conditions of operation.

Figure 5:
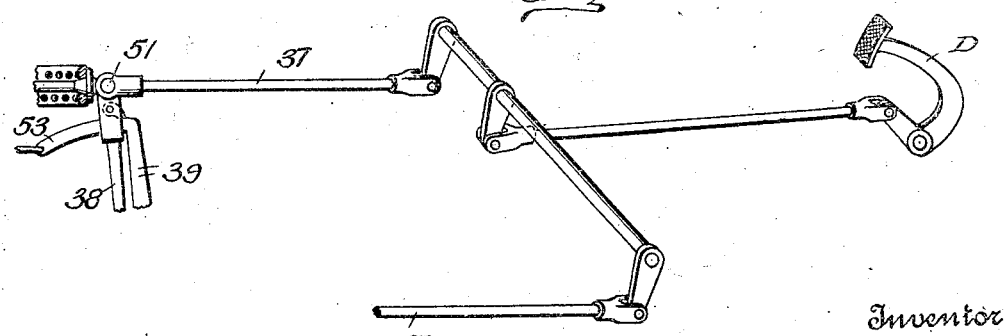

Figure 5, a fragmental perspective view of a conventional brake operating means in association with the brakes.

Figure 6:
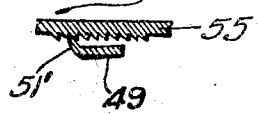

Fig. 6, a section on the line 6—6 of Fig. 4.

In the drawing A represents the rear axle of a motor vehicle, 1, 1 the brake drums, 2, 2 the contracting brake bands surrounding these drums, 3, 3, the brake anchor studs, 4, 4 the brackets secured to a nonrotating part of the axle and carrying the pivot pins 5, 5, upon which are mounted the bell-cranks 6, 6, all as previously described in my Letters Patent No. 1,440,842 of January 2, 1923.

I connect the vertical arms of the bell-cranks 6, 6 by a connecting rod 7 (hereafter called the equalizer rod) and latches 21, 21 pivoted to respective ends of the equalizer rod. Latch toes 23 are provided on the brackets 4, 4 and springs 22 are secured to the latches 21 and to a fixed point above them, so that the latches normally engage the toes 23 and serve to lock the equalizer rod in its central position when the brakes are in inoperative position.

It will also be noted that these latches lock the equalizer rod in its central position when the brakes are applied in backing the vehicle. In this case the effect of the braking action is to rotate the bands rearwardly producing a downward force on the short arm of the bell-cranks and an inward force on the long arms which is manifestly resisted by the latches. This locking action is provided to ensure efficient action of the brakes when applied to retard rearward motion of a vehicle.

In retarding forward movement, the action of equalization, as described in the aforementioned Letters Patent, is not interfered with, as the equalizer rod and latches assume the position shown in Fig. 2, since the tension on this rod causes the pivots between rod and latches to swing upward into alinement with the pivots between the bell-cranks and latches, thus unlatching the latter and permitting free movement of the equalizer rod in either direction.

The upper edges of the latch faces are beveled as shown at 21ª, so that the springs 22 will assist in returning the equalizer rod and the bell-cranks to their central position and it will also be noted that the springs 22 pull inwardly and of themselves tend to return the equalizer rod to its central position. These springs coact with the front brake supporting and centering means as will be explained later.

In Fig. 3 my brake retracting and supporting mechanism is shown. The pivot 51 connects the brake rod clevis 36 with the lever 38 and the retracting bolt 31. This bolt has a conical portion 32 under the head 33 which seats in a conical hole in the flange 30 of the bracket 29 which is secured to the axle disk 55. The retracting spring 35 secured in compression on the bolt 31 by the collar 34 keeps the bolt secure in the conical seat of the flange 30, while the rear face of the head 33 seats against the front face of the flange, so that the pivot 51 is held fixed against upward or downward movement as long as the brake is released. The lever 38 connects to the toggle lever 39 at the pivot 41 and it is seen that the front portion of the brake band and the parts 39, 43, 44 and 45 are thus suspended by the lever 38 from the pivot 51.

In applying the brake a forward pull is exerted on the rod 37 by pressing pedal D and the bolt 31 is pulled forward out of the conical seat, so that the pivot 51 is free to move up or down as the band 2 rotates to effect equalization as described in my aforementioned Letters Patent and when the forward pull on the rod 37 is released, it is also manifest that the spring 35 will cause the parts to return to their initial position, thus effecting the necessary return rotary movement of the band 2, so that the latches 21 assisted by the springs 22 will engage their toes 23 and lock the equalizing rod in its central position. The band 2 is therefore held free of the drum 1 by the proper positioning of the anchor stud 3 at the rear and the pivot 41 at the front, these pivots remaining fixed regardless of wear of the brake lining.

My self-adjusting mechanism which also acts as a self-regulating mechanism is illustrated in Figures 3 and 4 and consists of the following parts:—The toggle lever 39 is constructed with a ratchet arm 53 held by a ratchet 54 on the lever 38, so that the band can be tightened by a forward movement of this ratchet arm. This movement takes place around the pivot 41 and the pivots 40 and 42 are so positioned that an equal amount of take up will be obtained for both the upper and lower halves of the band 2. A link 47 is pivoted to the arm 53 at the point 57 and has a slot 48 in its opposite end in which pivot 52 on the lever 49 travels. The pivot 50 secures the lever 49 to the disk 55 and said lever includes means 51' coacting with the disk to resist rotative force exerted by the retracting spring 35, said means, however, permitting rotative movement of the lever under the influence of a force exerted by the driver in applying the brakes. Now it will be evident that the pivot 51 will be pulled forward in applying the brakes until the band 2 comes into contact with the drum 1 and that the link 47 will be pulled forward with the toggle lever 39 until the end 56 of the slot 48 reaches the pivot 52 after which any further movement will cause a rotation of the lever 49 around its pivot 50. When the brake is released the retracting spring 35 will return the various parts to their initial position. The rearward movement of the lever 39 will be limited by the length of the slot 48 and when this limit is reached, the lever 38 will rotate with respect to the lever 39 until the bolt 31 is properly seated in the flange 30 as previously described, and this rotation will produce a take up action between the ratchet 54 and the arm 53. As the brake lining wears down, this action will take place from time to time and the lever 49 will be gradually pulled forward until the limit of adjustment of lever 39 is reached.

By reference to Figure 4 it will be seen how the take up link acts to tighten one brake which may be too slack without tightening the other one. As described in my aforementioned Letters Patent, a slack band will be rotated rearwardly to produce equalization. This rotation is shown as raising the pivot 41 to the position 41', and the pivot 51 is shown pulled forward and moved upward. The position of the parts 49, 47 and 53 shown in dotted lines is the position corresponding to no rotation of the band, while those parts in full lines are shown to correspond to the rotation above described. It is seen that the pivot 57 moves up to the position 57' and that the distance 52—57' is greater than the distance 52—57. To make up for this increase in distance, the lever 49 is rotated forward, and as previously described, this rotation will produce, when the brake is released, a take up movement on the ratchet arm and the band will be tightened. On the opposite brake, however, the reverse action takes place and the distance 52—57' becomes shortened, so that no take up action occurs.

I claim:

1. In a brake system, the combination with duplicate brakes for retarding rotary movements in either of two directions, of a brake equalizing device, and means locking said device inoperative when the brakes are applied to retard rotary movement in one of said directions.

2. In a brake system, the combination with duplicate brakes for retarding rotary movements in either of two directions, of a brake equalizing device, and automatic means locking said device inoperative when the brakes are applied to retard rotary movement in one of said directions.

3. In a brake system, the combination with duplicate brakes, of equalizing mechanism for the brakes, and a latch device effective to lock said mechanism inoperative when the brakes are applied to retard rotary movement in one direction.

4. In a brake system, the combination with duplicate brakes, of equalizing mechanism for the brakes, and a latch device effective to lock said mechanism inoperative when the brakes are applied to retard rotary movement in one direction, and ineffective to lock said mechanism inoperative when the brakes are applied to retard opposite rotary movement.

5. In a brake system, the combination with duplicate brakes, of equalizing mechanism for the brakes, and a latch device normally positioned to lock said mechanism against operative movement, and actuated to release position by movement of the mechanism resulting from application of the brakes.

6. In a brake system, the combination with duplicate brakes, a common brake applying device, and a brake equalizing mechanism connecting the brakes, of retracting means for the device and brakes serving to support the brakes when the latter are in retracted position.

7. In a brake system, the combination with duplicate brakes, a common brake applying device, and a brake equalizing mechanism connecting the brakes, of retracting means for the device and brakes adapted for movement when the brakes are applied and locked against such movements when the brakes are retracted and serving to support the brakes when the latter are in retracted position.

8. In a brake system, the combination with duplicate brakes, of mechanism for equalizing the braking effect of the brakes, and automatic means for maintaining the operation of said mechanism effective to equalize said braking effect irrespective of the wear of said brakes.

In testimony whereof I hereunto affix my signature.

GEORGE L. SMITH.